US012522481B2

(12) United States Patent
Moll et al.

(10) Patent No.: US 12,522,481 B2
(45) Date of Patent: Jan. 13, 2026

(54) METHOD FOR MONITORING A CHAIN HOIST

(71) Applicant: KONECRANES GLOBAL CORPORATION, Hyvinkää (FI)

(72) Inventors: Oliver Moll, Solingen (DE); Torsten Sattler, Sprockhövel (DE)

(73) Assignee: Konecranes Global Corporation, Hyvinkää (FI)

( * ) Notice: Subject to any disclaimer, the term of this patent is extended or adjusted under 35 U.S.C. 154(b) by 0 days.

(21) Appl. No.: 18/865,935

(22) PCT Filed: Aug. 29, 2023

(86) PCT No.: PCT/EP2023/073685

§ 371 (c)(1), (2) Date: Nov. 14, 2024

(87) PCT Pub. No.: WO2024/047049

PCT Pub. Date: Mar. 7, 2024

(65) Prior Publication Data

US 2025/0171281 A1 May 29, 2025

(30) Foreign Application Priority Data

Aug. 31, 2022 (DE) ..................... 10 2022 122 034.6

(51) Int. Cl.
*B66D 3/26* (2006.01)
*B66D 3/20* (2006.01)

(52) U.S. Cl.
CPC *B66D 3/26* (2013.01); *B66D 3/20* (2013.01)

(58) Field of Classification Search
CPC ... B66D 1/20; B66D 1/58; B66D 3/18; B66D 3/26; G01P 3/02; G01P 3/04; G01P 3/06
See application file for complete search history.

(56) References Cited

U.S. PATENT DOCUMENTS 4,636,962 A 1/1987 Broyden et al.
6,644,629 B1 * 11/2003 Higashi .................... B66D 1/56 254/361
8,651,301 B2 2/2014 Kiova et al.
(Continued)

FOREIGN PATENT DOCUMENTS

CN 1590274 A 3/2005
CN 110386565 A 10/2019
DE 195 12 103 A1 10/1996
(Continued)

*Primary Examiner* — Erika J. Villaluna
(74) *Attorney, Agent, or Firm* — Gardner, Linn, Burkhart & Ondersma LLP

(57) ABSTRACT

A method for monitoring a chain hoist having an electric drive motor which is connected on the output side, via a friction clutch, to a transmission, wherein, via a sensor, a speed of the transmission is sensed, and the sensed speed of the transmission is compared with an operating speed of the drive motor by means of a control device. In order to achieve safe and efficient operation of the chain hoist, a vertical position of the load handling device of the chain hoist is also determined by means of the control device. The invention also relates to a chain hoist having a control device which is designed and configured to carry out the method according to the invention.

13 Claims, 3 Drawing Sheets

(56) References Cited

U.S. PATENT DOCUMENTS

2005/0065692 A1* 3/2005 Freitag .................... B66D 3/22
701/54

FOREIGN PATENT DOCUMENTS

| | | | |
|---|---|---|---|
| DE | 199 56 265 | A1 | 6/2001 |
| DE | 10 2015 105 517 | A1 | 6/2016 |
| EP | 1510498 | B1 | 3/2007 |

* cited by examiner

METHOD FOR MONITORING A CHAIN HOIST

The invention relates to a method for monitoring a chain hoist according to the preamble of claim 1 and to a chain hoist according to the preamble of claim 8.

Chain hoists of this type comprise an electric drive motor, a transmission and a friction clutch functionally arranged between the drive motor and the transmission. The aforementioned components of the chain hoist are usually arranged in a drive housing. Chain hoists of this type also have a chain and a load handling device suspended via the chain. The load handling device can be raised and lowered by moving the chain over at least one sprocket arranged on an output shaft of the transmission. Corresponding control commands are usually given by an operator via a control switch and transmitted from the control switch to a control device of the chain hoist.

It is known to equip chain hoists in this classification with one or more limit switches. The limit switch is used to enable overriding the control commands transmitted to the control device with a corresponding signal—in particular directed to the control device. If the limit switch is functioning properly, the drive motor of the chain hoist can be stopped using the signals of the limit switch and the resulting intervention of the control device, for example, even if a control command for raising or lowering has been transmitted to the control device.

The friction clutch of the chain hoist is primarily used to prevent overloading and resulting damage to the drive motor, the transmission and the chain. The friction clutch slips, for example, when a load that is too heavy is lifted. Slipping can also be caused by the load handling device hitting the drive housing or by hitting an end stop at one end of the chain when the chain is fully extended. However, if the friction clutch is set too sensitively, slipping can also occur.

By providing an upper limit switch, the load handling device can be prevented from hitting the drive housing. By providing a lower limit switch, it is possible to prevent the chain from being fully extended and blocked by the end stop. However, if one of the limit switches is defective, the drive motor is not stopped in time and the friction clutch slips when the load handling device hits the drive housing or when it hits the end stop.

Despite the slipping of the friction clutch,—known as clutch slippage—which is intended to prevent overloading of the chain, depending on the cause of the clutch slippage and the frequency of the clutch slippage due thereto, the chain can become overloaded and even break. This is particularly the case if the load handling device repeatedly hits the drive housing due to a defective upper limit switch or if it repeatedly hits the end stop due to a defective lower limit switch.

EP 1 510 498 B1 discloses a method for monitoring a chain hoist, by means of which a control device of the chain hoist can detect a deviation of the actual speed of the transmission from the target speed of the drive motor, and thus detect a slipping of the friction clutch. However, this method does not make it possible to determine the cause of clutch slippage.

From DE 199 56 265 A1 and DE 195 12 103 A1, methods for monitoring the operation of cable winches are known, in particular with regard to the number of cable turns wound on the winch.

DE 10 2015 105 517 A1 discloses a cable retraction and deployment device for aviation applications and a method for controlling the device, wherein end positions of the cable can be detected by means of a sensor.

The invention is therefore based on the object of providing a method for monitoring a chain hoist and providing a chain hoist, enabling safe and efficient operation of the chain hoist.

This object is achieved by a method having the features of claim 1 and by a chain hoist having the features of claim 8. Advantageous embodiments of the invention are given in the dependent claims and the following description.

According to the invention, in a method for monitoring a chain hoist having an electric drive motor which is connected to a transmission on the output side via a friction clutch, wherein a speed of the transmission is sensed via a sensor and the sensed speed of the transmission is compared with an operating speed of the drive motor by means of a control device, a safe and efficient operation of the chain hoist is achieved in that a vertical position of a load handling device of the chain hoist is also determined by means of the control device.

In other words, the method according to the invention provides for determining the vertical position of the load handling device in addition to the comparison between the sensed transmission speed and the motor operating speed.

The load handling device, designed as a load hook, for example, is suspended from a chain of the chain hoist. The chain can be arranged in a single-leg or multi-leg configuration, so that the load handling device is attached to a free end of the chain (single-leg) or the chain is deflected by the load handling device designed as a bottom block (multiple-leg). The chain can be moved via at least one sprocket that is fixedly mounted on an output shaft of the transmission. The rotational movement of at least one sprocket is transmitted to the chain via a positive connection with the chain, so that—according to the direction of rotation—the load handling device is raised or lowered. For this purpose, a rotary motion of the electric drive motor is transmitted to at least one sprocket, wherein the torque is converted via the transmission functionally arranged between them.

Corresponding control commands for lifting and lowering are transmitted, preferably from a control switch of the chain hoist, to the control device and from there to the drive motor. During lifting and lowering of the load handling device, the vertical position of the load handling device changes. The vertical position of the load handling device can be changed via the control commands transmitted to the drive motor.

If the load handling device is not raised or lowered, the vertical position of the load handling device remains the same. Only small changes in the vertical position of the load handling device, which are caused, for example, by vibrations of the load handling device and are considered negligible within the scope of the present invention, are then possible.

The vertical position of the load handling device can be a position between an upper end position and a lower end position arranged below the upper end position. The upper end position is a position of maximum possible lifting height, which is mechanically limited, for example by the load handling device hitting the drive housing of the chain hoist. The upper end position must be distinguished from a vertical position specified by an upper limit switch. The lower end position is a position of maximum possible lowering depth, which is also mechanically limited, for example by the end stop when the load handling device is completely lowered. The lower end position must be distinguished from a vertical position specified by a lower limit switch.

If the chain hoist is functioning properly, at least one limit switch provided on the chain hoist indicates when the vertical position of the load handling device corresponds to the vertical position specified by the limit switch. Based on the indication, the control device can intervene in the control process of the chain hoist and, for example, override the control commands transmitted from the control switch to the control device.

The vertical position of the load handling device determined according to the method according to the invention can be compared by the control device with a known vertical position—for example stored in a memory unit of the control device. The known vertical position is in particular the lower and/or upper end position and/or the vertical position specified by the at least one limit switch. The determined vertical position is preferably the current vertical position of the load handling device. The determined vertical position of the load handling device can alternatively or additionally be stored in the memory unit of the control device. By storing the data in this way, it is possible in particular for the at least one determined vertical position to be used for subsequent evaluation.

The sensor provided on the chain hoist preferably senses the speed of an individual shaft of the transmission, so that the speed of the transmission or transmission speed is understood to mean the speed of the individual shaft of the transmission. Alternatively, the sensor can also sense the speed of a single toothed wheel in the transmission. The sensor transmits the speeds it senses to the control device via sensor signals. The sensor signals can be stored in the form of sensor data in the memory unit of the control device.

The operating speed of the drive motor and/or motor operating speed is preferably determined from operating data of the drive motor. These can be stored in the memory unit of the control device for different operating states of the chain hoist.

By comparing the sensed transmission speed with the motor operating speed, a speed deviation or speed difference can be determined. This enables the control device to detect clutch slippage of the friction clutch functionally arranged between the drive motor and the transmission, in particular between a motor shaft and an input shaft of the transmission. Depending upon which shaft or toothed wheel of the transmission the speed is sensed on, the gear ratio of the transmission must be taken into account when determining the deviation. Preferably, the occurrence of clutch slippage is stored in the memory unit. An error message can also be generated.

Due to the functional design of the chain hoist, in particular because the load handling device is connected to the output shaft of the transmission, also known as the transmission output shaft, via the chain and at least one sprocket, a force or change in force acting on the chain has an effect on the torque applied to an input shaft of the transmission. Therefore, the force on the chain changes the torque applied to the input shaft of the transmission, also known as the transmission input shaft; this also changes the torque acting on the transmission part of the friction clutch. If the applied torque exceeds the maximum torque that the friction clutch can transmit and for which the friction clutch is adjusted, the friction clutch slips.

As a rule, the maximum transmittable torque corresponds to a value corresponding to the nominal load of the chain hoist. The friction clutch adjusted in this way slips when a load that is too heavy, i.e. a load that exceeds the nominal load, is lifted. If the friction clutch is set too sensitively, i.e. to a maximum transmittable torque that is lower than the value corresponding to the nominal load of the chain hoist, slipping can occur even at loads lower than the nominal load.

Clutch slippage caused by one of the two aforementioned causes is less critical with regard to preventing chain breakage than clutch slippage caused by the causes described below, and can therefore be tolerated with a comparatively higher frequency of occurrence.

The cause of slipping can also be the load handling device hitting the drive housing or hitting the end stop. Both causes can be traced back to a defective upper limit switch or a defective lower limit switch. The lifting or lowering movement of the load handling device is abruptly stopped by the load handling device hitting the drive housing or by striking the end stop while the drive motor continues to run. Due to the high load on the chain that occurs as a result, in particular as a result of the high tensile forces acting on the chain, especially as a result of frequent occurrence of such high loads, the chain may become overloaded and even break.

With the method according to the invention, not only can the clutch slippage itself be determined—but also the vertical position of the load handling device at the time of the clutch slippage. Therefore, if the control device detects clutch slippage based on sensor signals from the sensor, and if the determined vertical position of the load handling device can be assigned to the upper or lower end position, it can conclude, for example, that the corresponding upper or lower limit switch is defective. However, if the vertical position of the load handling device determined in the event of clutch slippage cannot be assigned to a vertical position stored in the memory unit of the control device, the control device can conclude that the clutch slippage is due to another cause, for example an excessive load on the load handling device.

This allows a cause for the clutch slippage to be determined and attributed to the clutch slippage. With the method according to the invention, it is therefore possible to distinguish between clutch slippage caused by an excessive load on the load handling device and clutch slippage caused by a defective limit switch. It can therefore also be provided that the optionally created error message varies according to the cause.

The method according to the invention can therefore be used to diagnose the failure of a limit switch and at least reduce the proportion of chain breaks that can be attributed to defective limit switches. This enables safe operation of the chain hoist. Furthermore, the application of the method according to the invention does not negatively affect the production costs required for a chain hoist, since no additional hardware is required compared to the chain hoist known from EP 1 510 498 B1.

In a first embodiment, the vertical position of the load handling device is determined based on sensor signals from the sensor.

In addition to the speed of the transmission, the vertical position of the load handling device is also determined using the sensor signals. The sensor signals are received and evaluated by the control device. Preferably, the sensor signals are stored in the memory unit of the control device. If the sensor is designed accordingly, it is possible to determine the vertical position of the load handling device based exclusively on the sensor signals.

In the first embodiment, it is particularly advantageous that a direction of rotation of the transmission is sensed on the basis of the sensor signals, and the vertical position of the load handling device is determined by "counting up" and "counting down" the sensor signals.

The direction of rotation of the transmission associated with raising or lowering the load handling device is detected in order to determine whether the sensor signals need to be counted up or down, i.e. whether the sensor signals need to be added or subtracted. Preferably, the direction of rotation of each shaft of the transmission is detected. Alternatively, the direction of rotation of the individual toothed wheel of the transmission can be detected.

The starting point for counting up and down, i.e. the initial vertical position of the load handling device, can be specified, for example, when the chain hoist is put into operation. It may also be provided that calibration, in particular a reset, of the starting point is possible during operation of the chain hoist. If the starting point for counting up and down is known, the change in the vertical position and thus also the (current) vertical position can be determined from the counting up and down. The control device, which is connected to the sensor via signal transmission, counts up when the load handling device is raised and counts down when the load handling device is lowered.

The incremental sensor preferably used for counting up and down comprises a fan disk fixed in a torque-proof manner on a shaft of the transmission, and a light barrier, which in particular has two photodetectors for detecting the direction of rotation. With such a sensor design, the vertical position of the load handling device can be determined exclusively on the basis of the sensor signals.

Depending on the direction of rotation, for example, every time the light barrier is interrupted, the corresponding sensor signal in the control device is added to the previous value of the sensor signals, i.e. counted up, or subtracted from it, i.e. counted down. The change in the vertical position of the load handling device during a single light barrier interruption is known, so that the vertical position of the load handling device can be derived from the value of the sensor signals.

In the first embodiment, it may additionally or alternatively be provided that an amplitude of a change in the sensor signals is determined.

It can then be determined, for example, how quickly the sensor signals used to sense the transmission speed change. If the vertical position of the load handling device corresponds to the upper or lower end position, a lifting or lowering movement is stopped abruptly as described above, so that the transmission speed is braked to zero very quickly. The sensor signals used to sense the transmission speed therefore change very quickly.

However, if the load on the load handling device is too great, the sensor signals used to sense the transmission speed change comparatively more slowly, since the force acting on the load handling device and the chain also changes more slowly.

This also makes it possible to determine the vertical position of the load handling device based on the extent of the change in the sensor signals, and thus assign clutch slippage to a cause.

In a second embodiment, which can be provided alternatively or in addition to the first embodiment, the vertical position of the load handling device is determined by means of timing.

The timing is first used to determine at what point after the start of the timing the clutch slippage occurs. The vertical position of the load handling device can then be determined by taking into account the vertical position of the load handling device at the start of the timing as well as the lifting speed of the chain hoist—or, if multiple lifting speeds are possible, based on the lifting speed selected at the time. In addition, any previously occurring clutch slippage is preferably taken into account in order to be able to determine the vertical position of the load handling device as accurately as possible.

The respective times for the upper end position, the lower end position and the vertical position specified by the at least one limit switch, i.e. the time required from the start of the timing to reaching the respective position, are preferably stored in the memory unit of the control device. The aforementioned times can be adapted to the corresponding chain hoist, in particular to the maximum lifting height and lifting speed of the given chain hoist.

By measuring the time and thereby determining the vertical position of the load handling device, it is possible to assign a cause to each clutch slip. Clutch slippage caused by an excessive load on the load handling device typically occurs shortly after the load has been lifted, for example when the load handling device is in a vertical position close to the ground. By means of timing, it can be determined whether the clutch slips shortly after the load is lifted, for example within two to three seconds. If this is the case, the control device can conclude that the clutch slippage is caused by an excessive load on the load handling device, or at least rule out the possibility that the clutch slippage is caused by a defective limit switch.

Clutch slippage caused by a defective upper limit switch only occurs later, for example after five or six seconds, because it takes significantly longer for the load handling device to reach the upper end position. Since the upper end position is above the vertical position specified by the upper limit switch and thus, in terms of time, after the vertical position specified by an upper limit switch, it can be concluded by means of the control device that the clutch slippage is caused by a defective upper limit switch.

The timing starts in particular when the load attached to the load handling device is lifted, for example from the ground. A corresponding command to start the timing can, for example, be linked to an activation of the lifting mode via the control switch.

For lowering, for example, the vertical position of the load handling device at which a previous lifting or lowering movement was interrupted can be taken as the starting point for the timing. According to the starting point and the lifting speed (selected in this case), the timing can then be used to determine whether the load handling device is at the lower end position when the clutch slips.

In the second embodiment, the control device preferably derives whether lifting or lowering is taking place from a direction signal of the control switch, i.e. in particular whether the lifting mode or the lowering mode is activated. Alternatively, the control device can derive this from the direction of rotation of the drive motor.

If the second embodiment is provided in addition to the first embodiment, one of the two embodiments can be used to verify the other embodiment, i.e. to confirm the vertical position of the load handling device. In a combination of the embodiments, it is also possible to determine from sensor signals detected by the sensor described above whether the load handling device is being raised or lowered.

In an advantageous and structurally simple manner, all embodiments provide for the sensor to sense the rotational speed of a transmission input shaft connected to the friction clutch.

The sensor is then located behind the friction clutch, particularly as seen from the drive motor. This makes it particularly easy to compare the speed of the transmission with the operating speed of the drive motor, since no gear ratio of the transmission needs to be taken into account.

It can advantageously be provided that when a deviation of the speed of the transmission from the operating speed of the drive motor is detected, and when there is a predefined vertical position of the load handling device, a visual and/or acoustic alarm is issued, and/or the chain hoist is only allowed to lower the load handling device, and/or only a creep speed of the chain hoist is allowed, and/or the drive motor is switched off.

One of the measures mentioned above, which serve in particular to protect the chain hoist, can therefore be initiated according to the vertical position of the load handling device in the event of clutch slippage, and thus according to the cause of the clutch slippage and/or the frequency of the clutch slippage occurring.

The control device is thus able to initiate different measures in the event of clutch slippage caused by a defective limit switch to those initiated in the event of clutch slippage caused by other causes, such as excessive load on the load attachment device. It is also not necessary to take any action every time the clutch slips. If, for example, the clutch slippage is caused by too great a load on the load handling device or a friction clutch that is set too sensitively, the chain is usually not subjected to such a load that the chain breaks, even if this occurs frequently. Such clutch slippage is also referred to as non-critical. In the case of such non-critical clutch slippage, for example, no drastic measure, such as switching off the drive motor, is necessary.

Therefore, for example, a maximum number of clutch slips caused by a defective limit switch and a maximum number of clutch slips caused by other causes can be stored in the memory unit of the control device. It can be provided that, after a cause has been assigned, each clutch slip is added to the value previously stored for this cause, and when the specified maximum number for this cause is reached, the corresponding measure is initiated.

In this context, it can also be taken into account that when lowering a load, the cause of clutch slippage is usually a defective limit switch. Clutch slippage caused by an excessive load on the load handling device can at least be ruled out during lowering.

By taking cause-related measures in the event of clutch slippage, customer complaints can be avoided, and thus both safe and efficient operation of the chain hoist can be enabled.

The invention further relates to a chain hoist having an electric drive motor, a transmission and a friction clutch, wherein the electric drive motor is connected to the transmission on the output side via the friction clutch, as well as a sensor, a load handling device and a control device. The control device is designed and configured to carry out the method according to the invention.

Particularly advantageously, the sensor comprises a fan disk arranged in a torque-proof manner on a shaft of the transmission, preferably the transmission input shaft, as well as a light barrier by means of which the speed of the fan disk can be sensed.

With the sensor designed in this way, the speed of the fan disk and thus also the speed of the transmission shaft can be sensed. In addition, such a sensor can be used to determine the direction of rotation of the transmission shaft and to count up and down the sensor signals.

Further advantageous embodiments and details of the invention emerge from the following description. In the figures:

FIG. 1 is a schematic sectional view of a chain hoist 1 with a control device 19 for carrying out at least one embodiment of the method according to the invention.

Figure 1:
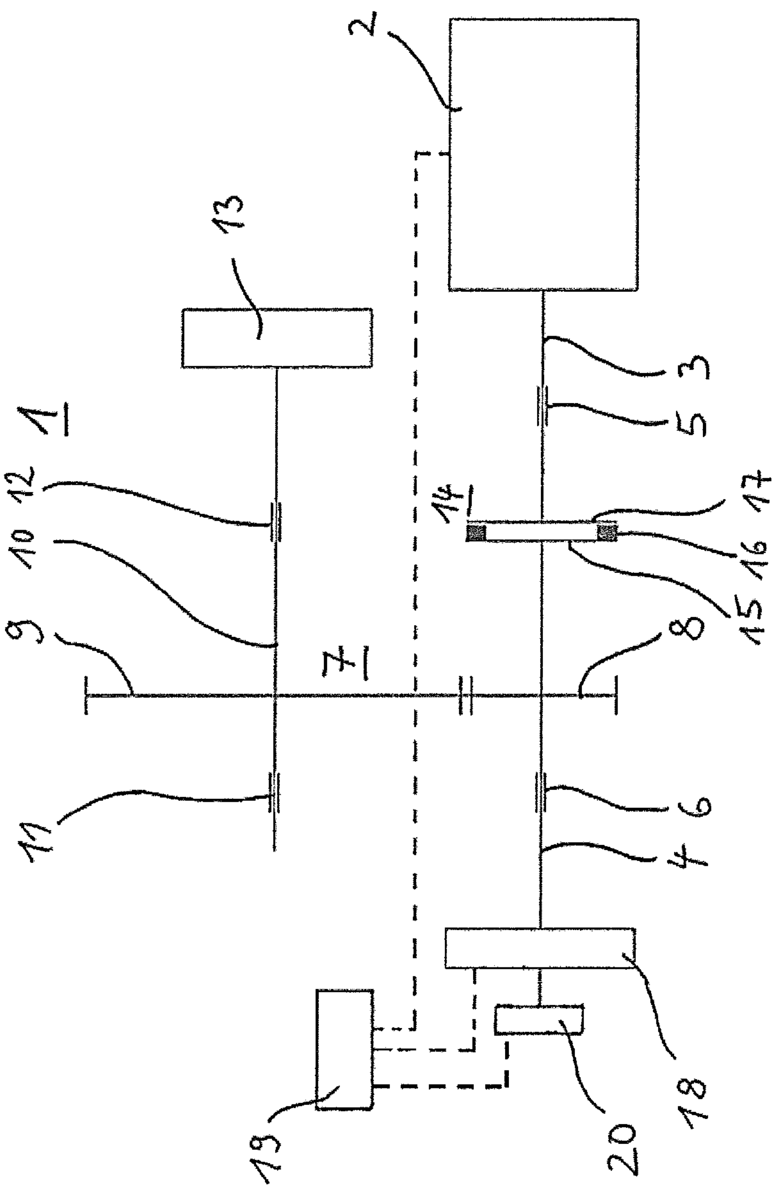
FIG. 1 is a schematic sectional view of a chain hoist with a control device for carrying out at least one embodiment of the method according to the invention.

The chain hoist 1 has an electric drive motor 2 with a motor shaft 3 protruding on the output side of the drive motor 2. The motor shaft 3 is supported by a first bearing 5, which is preferably designed as a roller bearing. The drive motor 2 is controlled by means of the control device 19.

The chain hoist 1 also has a transmission 7, which in the present exemplary embodiment is designed as a single-stage mechanism, but can also be designed as a multi-stage mechanism. The transmission input shaft 4 of the transmission 7 is arranged coaxially to the motor shaft 3 and is supported by a second bearing 6, which is preferably also designed as a roller bearing. The transmission 7 comprises a first toothed wheel 8 which is arranged in a torque-proof manner on the transmission input shaft 4 and which meshes with a second toothed wheel 9 which is arranged in a torque-proof manner on a transmission output shaft 10. The transmission output shaft 10, which is arranged parallel to the transmission input shaft 4, is supported on both sides of the second toothed wheel 9 by a third bearing 11 and a fourth bearing 12, which are preferably also designed as roller bearings.

A sprocket 13 is arranged on the transmission output shaft 10, and in this case at one end of the transmission output shaft 10, in a torque-proof manner. This sprocket 13 serves in the usual way to provide a positive drive for the chain 22 (not shown) of the chain hoist 1. A load handling device 21 (not shown) suspended from the chain 22 is raised and lowered by moving the chain 22 over the sprocket. When lifted from the sprocket 13, the chain 22 runs into a chain storage unit (not shown) of the chain hoist 1.

Corresponding control commands for raising and lowering the load handling device 21 are received by the control device 19 and transmitted by it to the drive motor 2. In the present case, the control commands received by the control device 19 are sent by a control switch of the chain hoist 1.

A friction clutch 14 is arranged between the transmission input shaft 4 and the motor shaft 3. The friction clutch 14 substantially consists of a clutch disk 15 with an annular clutch lining 16, a pressure plate 17 and a spring element (not shown) for generating a preload between the pressure plate 17 and the clutch disk 15, which determines the maximum transmittable torque. The pressure plate 17 is arranged in a torque-proof manner on the motor shaft 3 and the clutch disk 15 is arranged in a torque-proof manner on the transmission input shaft 4. The friction clutch 14 is set to a maximum transmittable torque which corresponds to the nominal load of the chain hoist 1. If the maximum torque that can be transmitted by means of the friction clutch 14 is exceeded, it slips.

With a brake 20 provided on the transmission input shaft 4, the transmission input shaft 4 can be braked if necessary or blocked when it is at a standstill. The brake 20 is controlled by the control device 19.

A sensor 18 is also arranged on the transmission input shaft 4. The sensor 18 serves to determine the speed of the transmission input shaft 4 and comprises, in addition to a fan disk (not shown) arranged in a torque-proof manner on the transmission input shaft 4, a light barrier (not shown) with two photodetectors arranged in the area of the compartments of the fan disk. The speed of the fan disk and thus the speed of the transmission input shaft 4 is then sensed by means of the light barrier, in particular by determining the frequency of the light barrier interruption.

The sensor 18 is connected to the control device 19 by means of signals, wherein the sensor 18 transmits the rotational speeds sensed by it to the control device 19 by means of sensor signals. These sensor signals are processed by the control device 19 and/or stored in the form of sensor data in a memory unit of the control device 19.

Should the maximum torque that can be transmitted by the friction clutch 14 be exceeded and thus the friction clutch 14 slip (referred to as clutch slippage), this is detected by means of a comparison of the speed of the transmission input shaft 4 with an operating speed of the drive motor 2 carried out by means of the control device 19.

Clutch slippage may be caused by an excessive load on the load handling device 21. Since the friction clutch 14 is set to a maximum transmittable torque, which corresponds in particular to the nominal load of the chain hoist 1, clutch slippage caused by a friction clutch 14 that is set too sensitively is not to be expected in this case.

However, the clutch slippage can also be caused when an upper end position OE is reached by the load handling device 21 hitting a drive housing 23 of the chain hoist 1 (see FIGS. 2 to 5) or when a lower end position UE is reached by striking the end stop (not shown) due to a completely extended chain 22.

The chain hoist 1 also has an upper limit switch and a lower limit switch (both not shown). If the limit switches are functioning properly, they indicate this; or they indicate this as soon as the load handling device has reached the vertical position POE, PUE specified by the respective limit switch (see FIGS. 2 to 5). Based on such an indication and/or the corresponding limit switch signals, the control device 19 overrides the control commands transmitted by the control switch and stops the drive motor 2 in time.

By providing an upper limit switch, it is possible, for example, to prevent the load handling device 21 from hitting the drive housing 23. By providing a lower limit switch, it is possible, for example, to prevent the chain 22 from being fully extended and blocked due to the end stop. However, if one of the limit switches is defective, the drive motor 2 is not stopped in time and the friction clutch 14 slips when the load handling device 21 hits the drive housing 23 or when it hits the end stop.

By means of the control device 19, a vertical position PLAM of the load handling device 21 is determined. The vertical position PLAM of the load handling device 21 is used to assign a clutch slippage occurring on the friction clutch 14 to a cause for this clutch slippage, for example in order to be able to detect a defective limit switch.

If the control device 19 detects clutch slippage based on sensor signals from the sensor 18, and the determined vertical position PLAM of the load handling device 21 corresponds to the upper end position OE or lower end position UE (see FIGS. 2 to 5), both of which are stored in the memory unit of the control device 19, the control device 19 concludes that the corresponding limit switch is defective.

If, however, the vertical position PLAM of the load handling device 21 determined during clutch slippage is not assigned to a vertical position stored in the control device 19, the control device 19 concludes that the clutch slippage is due to another cause, for example an excessive load on the load handling device 21.

The vertical position PLAM of the load handling device 21 can be determined by means of two different embodiments of a method for monitoring the chain hoist 1, wherein the two embodiments can be used independently of one another or in combination with one another. The control device 19 can carry out at least one of these embodiments.

In a first embodiment of the method, the vertical position PLAM of the load handling device 21 is determined based on sensor signals from the sensor 18. In addition to the speed of the transmission input shaft 4, the vertical position PLAM of the load handling device 21 is also determined based on the sensor signals. For this purpose, the sensor signals are received and evaluated by the control device 19. In the present embodiment of the sensor 18 with fan disk and light barrier, it is possible to determine the vertical position PLAM of the load handling device 21 exclusively on the basis of the sensor signals.

A direction of rotation of the transmission input shaft 4 is first determined via corresponding sensor signals from the sensor 18, which is connected to the control device 19. For this purpose, the direction of rotation of the fan disk is detected using the two photodetectors of the light barrier. The initial vertical position PLAM of the load handling device 21, i.e. the starting point for counting up and down, is prespecified. The vertical position PLAM of the load handling device 21 is determined, given knowledge of the direction of rotation, i.e. knowledge of whether the load handling device is being raised or lowered, in particular by "counting up" and "counting down" the sensor signals. For example, the control device 19 counts up when the load handling device 21 is raised and counts down when the load handling device 21 is lowered. For this purpose, according to the direction of rotation, the corresponding sensor signal is added to or subtracted from the previous value of the sensor signals each time the light barrier is interrupted. The change in the vertical position PLAM of the load handling device 21 during a single light barrier interruption is known, so that the vertical position PLAM of the load handling device 21 can be derived from the value of the sensor signals.

Alternatively or additionally, an amplitude of a change in the sensor signals can be determined. For example, it is then determined how quickly the sensor signals change. If the vertical position PLAM of the load handling device 21 is equal to the upper end position OE or the lower end position UE, a lifting or lowering movement is stopped abruptly so that the change in the sensor signals occurs very quickly. However, if the load on the load handling device 21 is too great, the change in the sensor signals occurs comparatively more slowly. This also makes it possible to assign clutch slippage to a cause based on the rate of change of the sensor signals.

In a second embodiment of the method, the vertical position PLAM of the load handling device 21 is determined by means of timing. The timing starts in particular when a load attached to the load handling device 21 is lifted from the ground. A corresponding start command for timing can, for example, be linked to an activation of the lifting mode via the control switch. By means of timing, it is first determined at what point the clutch slippage occurs after the load has been lifted. The vertical position PLAM of the load handling device 21 can then be determined based on the lifting speed of the chain hoist 1 or—if multiple lifting speeds are possible-based on the lifting speed selected in this case.

Clutch slippage caused by an excessive load on the load handling device 21 typically occurs shortly after the load has been lifted, i.e. when the load handling device 21 is in a vertical position PLAM close to the ground. By means of timing it can be determined whether the clutch slips shortly after the load is lifted. If this is the case, the control device 19 can conclude that the clutch slippage is caused by an excessive load on the load handling device 21, or at least rule out that the clutch slippage is caused by a defective limit switch.

Clutch slippage caused by a defective upper limit switch only occurs later, since it takes significantly longer for the load handling device 21 to reach the upper end position OE. Since the upper end position OE is later chronologically than the vertical position POE specified by an upper limit switch, i.e. is arranged above the specified vertical position POE (see FIGS. 2 to 5), it can be concluded by means of the control device 19 that the clutch slippage is caused by a defective upper limit switch.

For lowering, for example, the vertical position PLAM of the load handling device 21, at which a previous lifting or lowering movement was interrupted, can be taken as the starting point for a timing. Depending on the starting point, it can then be determined by means of the timing whether the load handling device 21 is at the lower end position UE when the clutch slip occurs.

In the second embodiment, in particular, a previous clutch slippage is taken into account in order to be able to determine the vertical position PLAM of the load handling device 21 as accurately as possible. The control device 19 can determine whether lifting or lowering is taking place from the direction of rotation of the drive motor 2 or from a direction signal of the control switch or from sensor signals detected by the sensor 18.

If the second embodiment is provided in addition to the first embodiment, one of the two embodiments can be used to verify the other embodiment, i.e. to confirm the vertical position PLAM of the load handling device 21.

If a deviation of the speed of the transmission input shaft 4 from the operating speed of the drive motor 2 is detected and if the vertical position PLAM of the load handling device 21 corresponds to the upper end position OE or the lower end position UE, a visual and/or acoustic alarm can be issued by the control device 19. Additionally or alternatively, the chain hoist 1 can only be allowed to lower the load handling device 21. Additionally or alternatively, only a creep speed of the chain hoist 1 can be allowed. Additionally or alternatively, the drive motor 2 can be switched off.

One of the measures mentioned above, which serve in particular to protect the chain hoist 1, can therefore be initiated according to the cause of the clutch slippage and/or the frequency of occurrence of the clutch slippage. The control device 19 is thus able to initiate different measures in the event of clutch slippage caused by a defective limit switch than in the event of clutch slippage caused, for example, by an excessive load on the load attachment device 21. It is also not necessary to take any action every time the clutch slips.

If the clutch slippage is caused by an excessive load on the load handling device 21 or a friction clutch 14 that is set too sensitively, the chain 22 is generally not loaded to such an extent that the chain 22 breaks, even if it occurs frequently. This clutch slippage is also referred to as non-critical.

Therefore, for example, a maximum number of clutch slips caused by a defective limit switch and a maximum number of clutch slips caused by other causes can be stored in the control device 19 or in the memory unit of the control device 19. It can then be provided that a counter is incremented each time the clutch slips, and when the specified maximum number is reached, the appropriate measure for this cause is initiated.

FIGS. 2 to 5 show a schematic illustration of the chain hoist 1 at different vertical positions PLAM of the load handling device 21.

During lifting and lowering of the load handling device 21, the vertical position PLAM of the load handling device 21 changes. Otherwise, i.e. when the load handling device 21 is not raised or lowered, the vertical position PLAM of the load handling device 21 remains the same.

The vertical position PLAM of the load handling device 21 can be a position between the upper end position OE and the lower end position UE. The upper end position OE is a position of maximum possible lifting height, which is mechanically limited by the load handling device 21 hitting the drive housing 23. Below the upper end position OE is the vertical position POE specified by the upper limit switch.

The lower end position UE is a position of maximum possible lowering depth, which is mechanically limited by the end stop when the load handling device 21 is completely lowered. Above the lower end position UE is the vertical position PUE specified by the lower limit switch.

Figure 2:
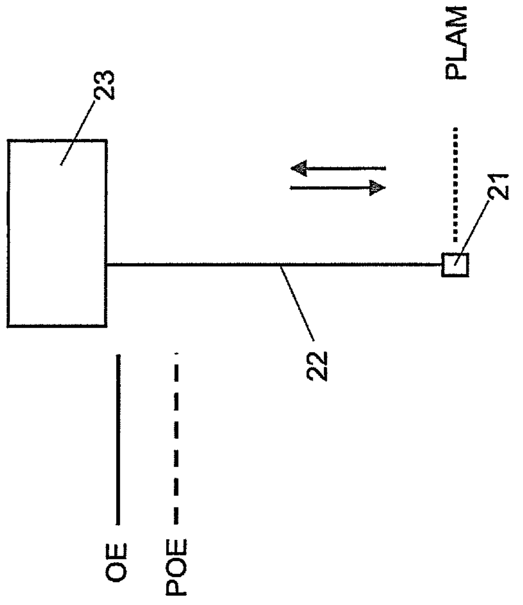

In FIG. 2, the vertical position PLAM of the load handling device 21 is arranged between the vertical position PUE specified by the lower limit switch and the vertical position POE specified by the upper limit switch. A clutch slippage occurring in this vertical position is not attributed by the control device 19 (see FIG. 1) to a defective limit switch, but to another cause, such as an excessive load on the load handling device 21.

Figure 3:
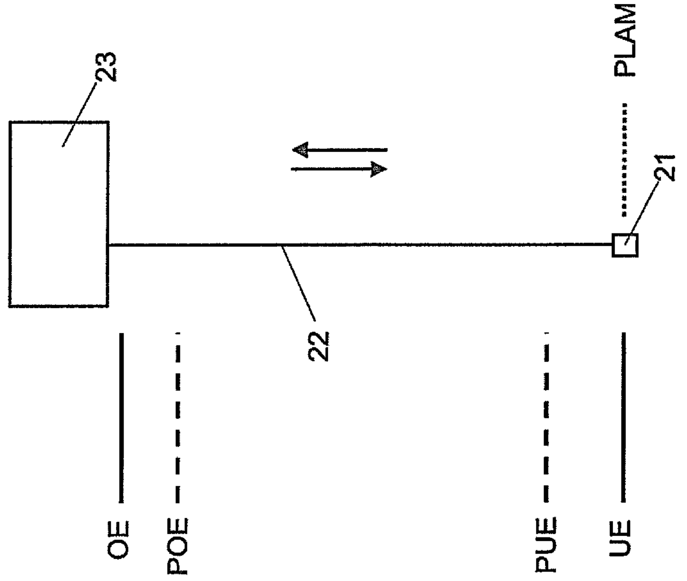
FIGS. 2 to 5 are schematic illustrations of the chain hoist at different vertical positions of the load handling device.
Figure 4:
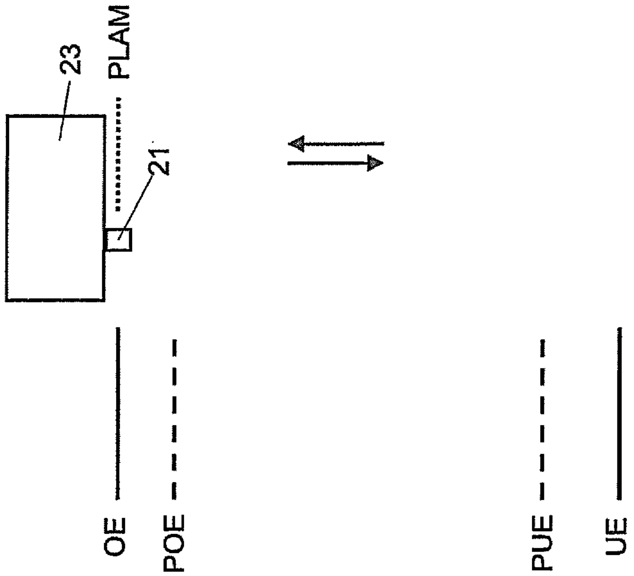

In FIG. 3, the vertical position PLAM of the load handling device 21 corresponds to the lower end position UE, and in FIG. 4 corresponds to the upper end position OE. A clutch slippage occurring in such a vertical position PLAM of the load handling device 21 is assigned by the control device 19 to a defective lower (FIG. 3) or upper (FIG. 4) limit switch.

Figure 5:
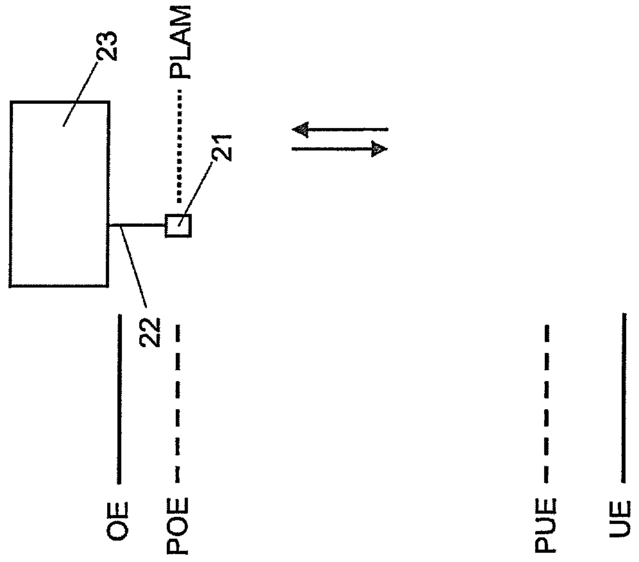

In FIG. 5, the vertical position PLAM of the load handling device 21 corresponds to the vertical position POE specified by the upper limit switch. A functioning upper limit switch would indicate this so that the control device 19 can intervene accordingly. This applies accordingly if the vertical position PLAM of the load handling device 21 is equal to the vertical position PUE specified by the lower limit switch.

LIST OF REFERENCE SIGNS

1 chain hoist
2 drive motor
3 motor shaft
4 transmission input shaft
5 first bearing
6 second bearing
7 transmission
8 first toothed wheel
9 second toothed wheel
10 transmission output shaft
11 third bearing
12 fourth bearing
13 sprocket
14 friction clutch
15 clutch disk
16 clutch lining
17 pressure plate
18 sensor
19 control device
20 brake
21 load handling device
22 chain
23 drive housing PLAM vertical position, load handling device
POE vertical position, upper limit switch
PUE vertical position, lower limit switch
OE upper end position
UE lower end position

The invention claimed is:

1. A method for monitoring a chain hoist having a load handling device, an electric drive motor having an output side, a transmission, and a friction clutch, the electric drive motor being connected on the output side to the transmission via the friction clutch, said chain hoist further having a sensor and a control device, and the control device having memory and operable to process signals, said method comprising:

sensing a speed of the transmission via the sensor;

comparing the sensed speed of the transmission with an operating speed of the drive motor with the control device;

determining a vertical position of the load handling device of the chain hoist with the control device based on sensor signals from the sensor; and using the vertical position of the load handling device to assign a cause to a clutch slippage occurring on the friction clutch.

2. The method according to claim 1, further comprising detecting a direction of rotation of the transmission based on the sensor signals; and said determining the vertical position of the load handling device includes determining the vertical position by "counting up" and "counting down" the sensor signals.

3. The method according to claim 2, further comprising determining an amplitude of a change in the sensor signals.

4. The method according to claim 1, further comprising determining an amplitude of a change in the sensor signals.

5. The method according to claim 1, said determining the vertical position of the load handling device includes determining the vertical position of the load handling device based on timing.

6. The method according to claim 1, wherein said sensing further includes sensing the speed of a transmission input shaft connected to the friction clutch via the sensor.

7. The method according to claim 1, wherein when a deviation of the speed of the transmission from the operating speed of the drive motor is detected and when a predefined vertical position of the load handling device is present, issuing a visual and/or acoustic alarm, and/or only allowing the chain hoist to lower the load handling device, and/or only allowing a creep speed of the chain hoist, and/or switching off the drive motor.

8. A chain hoist comprising:

a load handling device;

an electric drive motor having an output side;

a transmission;

a control device with a memory and operable to process signals;

a sensor; and a friction clutch, the electric drive motor being connected on the output side to the transmission via the friction clutch, wherein the control device is designed and configured to carry out the method according to claim 1.

9. The chain hoist according to claim 8, wherein the transmission has a shaft, the sensor comprises a fan disk and a light barrier, the fan disk being arranged in a torque-proof manner on the shaft of the transmission, wherein the speed of the fan disk can be sensed using the light barrier.

10. The chain hoist according to claim 9, wherein the transmission has a transmission input shaft, and the fan disk is arranged in a torque-proof manner on the transmission input shaft.

11. The method according to claim 1, further comprising determining with the control device that the respective upper or lower limit switch is defective if it detects clutch slippage based on sensor signals from the sensor and if the determined vertical position of the load handling device can be assigned to the upper or lower end position.

12. The method according to claim 1, further comprising determining with the control device that the clutch slippage is due to another cause, if the vertical position of the load handling device determined in the event clutch slippage cannot be assigned to a vertical position stored in the memory unit of the control device.

13. The method according to claim 12, wherein determining with the control device that the clutch slippage is due to another cause includes determining with control device that the other cause includes an excessive load on the load handling device if the vertical position of the load handling device determined in the event clutch slippage cannot be assigned to a vertical position stored in the memory unit of the control device.

* * * * *